Figure 1:
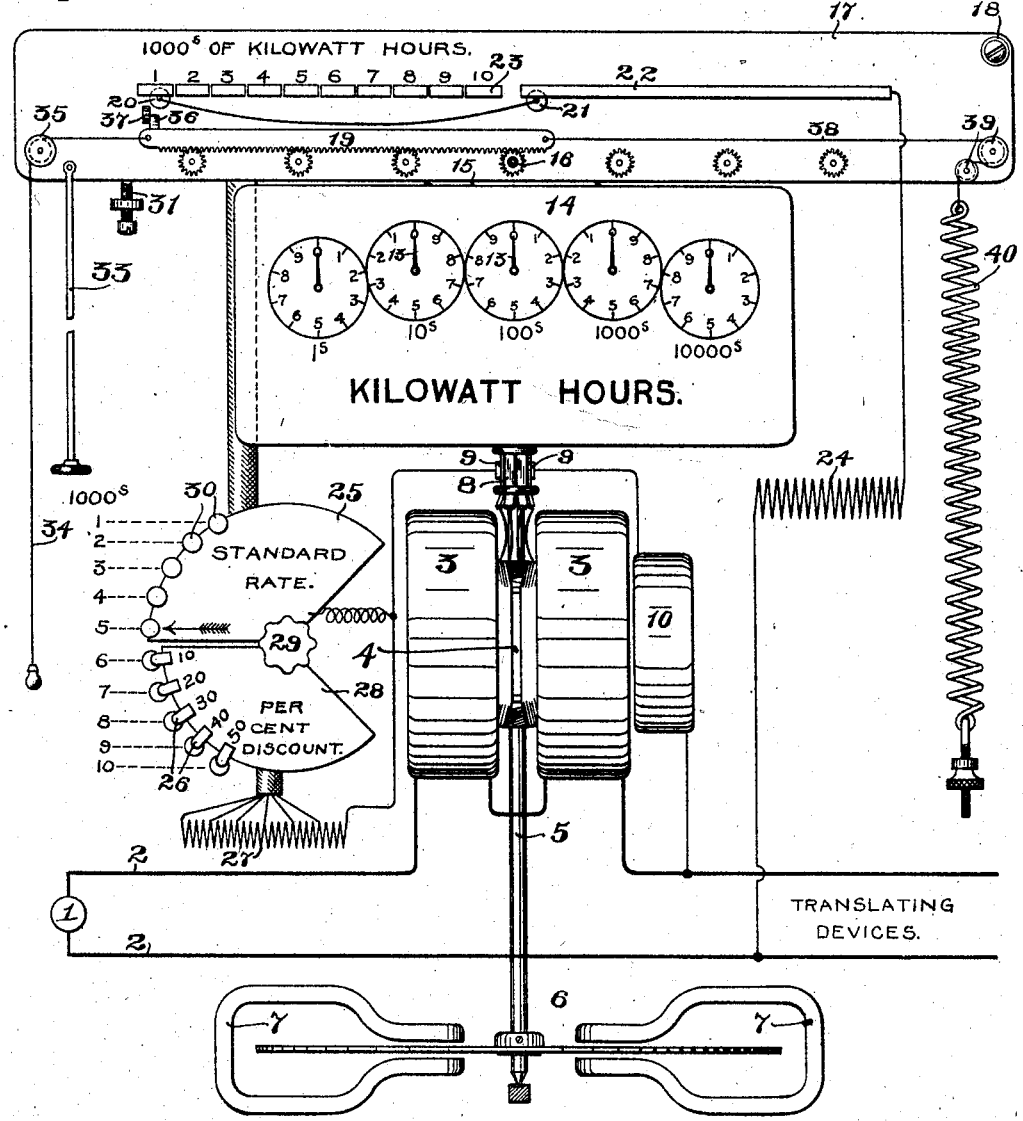

No. 796,047. PATENTED AUG. 1, 1905.
T. DUNCAN.
ELECTRIC METER.
APPLICATION FILED JULY 18, 1901. RENEWED JAN. 7, 1905.

2 SHEETS—SHEET 1.

WITNESSES:
INVENTOR.
Thomas Duncan
By Charles A. Brown Gragg & Belfield
ATTORNEYS.

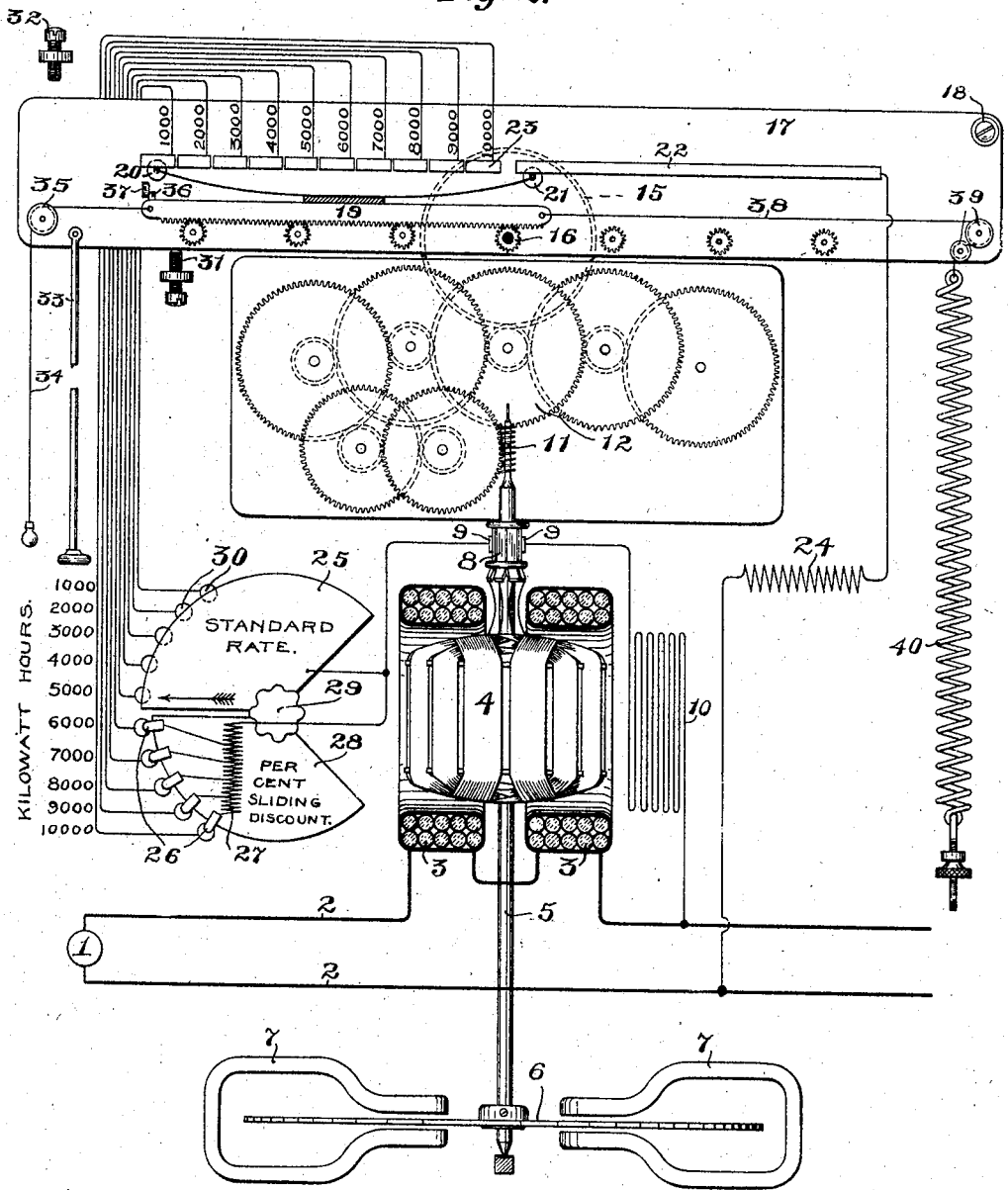

UNITED STATES PATENT OFFICE.

THOMAS DUNCAN, OF CHICAGO, ILLINOIS.

ELECTRIC METER.

No. 796,047. Specification of Letters Patent. Patented Aug. 1, 1905.

Application filed July 18, 1901. Renewed January 7, 1905. Serial No. 239,973.

*To all whom it may concern:*

Be it known that I, THOMAS DUNCAN, a citizen of the United States, residing at Chicago, in the county of Cook and State of Illinois, have invented a certain new and useful Improvement in Electric Meters, (Case No. 25,) of which the following is a full, clear, concise, and exact description, reference being had to the accompanying drawings, forming a part of this specification.

My invention relates to electric meters, and has for its object the provision of a meter which may operate at one rate per unit of load or energy up to a given predetermined amount and at a reduced rate per unit of load or energy during the consumption of additional energy or one reduced rate per unit of load or energy for the predetermined additional quantity of energy, a further reduced rate per unit of load or energy for the predetermined additional quantity of energy, a further reduced rate for another predetermined additional quantity of energy, &c., the invention being an improvement upon the systems disclosed in my applications Serial Nos. 68,753 and 68,754, filed July 18, 1901.

By means of my invention I am enabled to provide a meter which is adapted to operate at one rate of operation to measure load or energy that the consumer is to be charged for at a given rate, the meter in its further operation rotating at a reduced rate to afford the consumer the discount agreed upon, or reduced rates if the consumer is to be afforded a sliding discount. The consumer may, for example, be charged the normal rate for a given minimum quantity of energy, a reduced rate for a given excess quantity of energy, a further reduced rate for a further given excess quantity of energy, &c.

My present invention is an improvement upon the apparatus disclosed in my said copending applications in that but one regulating-switch is employed and one set of trolley-contacts, with the corresponding trolley-roller, is dispensed with. That switch blade in accordance with my present invention that effects the connection of the discount resistance with the trolley-contacts is preferably made of insulating material and itself carries the terminal or terminals of the discount resistance which are brought by it into electrical connection with the switch parts connected with the trolley-contact, so that when the trolley reaches the trolley-contacts connected with the resistance terminal or terminals affected by the said blade the meter is operated at a reduced rate or at a successively-decreasing rate. Thus the adjustment of the meter may be effected in one operation and by means of one instrumentality, by the employment of which instrumentality a special set of trolley-contacts and a trolley-roller corresponding thereto may be dispensed with.

I will explain my invention more fully by reference to the accompanying drawings, in which—

Figure 1 is a diagrammatic view of a system of electrical distribution, with a meter constructed in accordance with my invention associated therewith. Fig. 2 is a view similar to Fig. 1, the reading-dial of the instrument being removed, while the circuit connections are more diagrammatically illustrated.

Like parts are indicated by similar characters of reference in both views.

I have illustrated in both figures a source of current 1, either direct or alternating, conveying current over mains 2 2 to translating devices. A current field-winding, subdivided into coils 3 3, is included in one of the mains and produces a field proportional to the current. A pressure-winding, in this instance in the form of a commutated armature 4, is mounted upon a spindle 5, at the lower end of which is provided a damping-disk 6, arranged within the fields of permanent magnets 7 7. The spindle 5 supports the commutator 8, which is in engagement with the commutator-brushes 9 9, which brushes include the armature 4 in bridge of the transmission-mains, whereby a field is produced in proportion to the pressure. There may be also included in circuit with the armature a starting-coil 10 for the purpose of overcoming friction and aiding in the operation of the meter upon light loads. There is thus organized the motor element of a wattmeter; but I do not wish to be limited to the precise form of meter illustrated for measuring loads.

The upper end of the spindle is provided with a worm 11, which engages the wheels of a counting-train 12, that actuate the indexes 13 upon the reading-dial 14. This wheel-train includes a wheel 15, that is preferably distinct from the counting portion of the train as far as the operation of the indexes is concerned, but is actuated at a suitable rate to include the prediscount resistance in circuit or otherwise modify the rate of operation of the meter at the present time. This wheel 15 is provided with a pinion 16, axially arranged with respect thereto, this pinion 16 being insulated from the wheel 15 and the swinging frame 17, hinged at 18. The pinion 16 engages the horizontally-movable trolley rack-bar 19, upon which are mounted trolley-wheels 20 and 21. The trolley 21 engages an elongated trolley-bar 22, while the trolley 19 engages the set of trolley-contacts 23. The trolley-bar 22 is connected with one side of the transmission-circuit, a resistance 24 being included in this connection for the purpose of reducing the current flowing through the armature. The connection from this side of the transmission-circuit continues from the trolley-bar 22 and its engaging trolley-roller 21 by way of the trolley-roller 20, a contact of an engaging trolley-contact 23, thence through either a switch-blade 25 to the armature and the other side of the transmission-circuit or through a resistance-terminal 26, a section of prediscount resistance 27, through the armature to the said other side of the transmission-circuit.

The discount resistance 27 is in this instance shown divided into a number of sections provided with brush-terminals 26, mounted upon a plate 28, composed, preferably, of insulating material, the plates or blades 25 and 28 being mounted upon a common rotatable support 29. A series of buttons 30, in electrical connection with the trolley-contacts 23, are provided for engagement either with the metallic plate 25, and thence directly with the armature or with a resistance terminal or terminals 26, connection being thus effected between the trolley-contacts and the armature through a resistance-brush. The meter may be organized, for example, to maintain the trolley-roller 20 in engagement with the first trolley-contact during the time the meter is measuring one thousand kilowatt-hours. During the time the meter is measuring the second one thousand kilowatt-hours the trolley is in engagement with the second trolley-contact. During the time the meter is measuring the third one thousand kilowatt-hours the trolley is in engagement with the third trolley-contact, and so on throughout the series, there being illustrated ten trolley-contacts, each corresponding to a quantity of energy one thousand kilowatt-hours. The sections of the resistance 27 may be of such character as to afford a sliding discount by their successive and cumulative connection with the armature of ten, twenty, thirty, forty, and fifty per cent. for the various quantities of energy consumed, the inclusion of the resistance being determined by the position of the switch-blade 25 and the supporting-blade 28.

Other rates of discounts may be arranged for or only one rate of discount may be provided for without departing from the spirit of the invention.

It may be assumed, for example, that the consumer is to receive no discount during the time that the first five thousand kilowatt-hours are being consumed. For this purpose then the contact-blade 25 is placed in engagement with the five upper contact-buttons 30. After these five thousand kilowatt-hours have been consumed there may be an arrangement with the consumer whereby for a quantity of energy between five thousand and six thousand kilowatt-hours he is to be allowed a ten per cent. discount; between six thousand and seven thousand kilowatt-hours, twenty per cent.; between seven thousand and eight thousand kilowatt-hours, thirty per cent.; between eight thousand and nine thousand kilowatt-hours, forty per cent.; between nine thousand and ten thousand kilowatt-hours, fifty per cent. The meter illustrated in Figs. 1 and 2 is organized and adjusted to afford these various sliding discounts. Thus when the trolley-roller is in engagement with a contact 23 during the consumption of the sixth one thousand kilowatt-hours the first section of the resistance is included in circuit with the armature to reduce the torque ten per cent. per unit of load or energy to afford the consumer the agreed discount. During the time the trolley-roller is in engagement with the trolley-contact corresponding to the seventh one thousand kilowatt-hours two sections of the prediscount resistance are included in circuit to effect a reduction of the torque of the meter twenty per cent. during the time the meter is measuring the energy of the seventh one thousand kilowatt-hours. If the consumer is not to receive any discount until after six thousand kilowatt-hours have been consumed, the blades 28 and 29 are rotated in unison to bring the six upper buttons 30 into contact with the blade 25 and the four lower buttons in contact with the four upper terminals of the resistance.

The swinging frame 17 normally rests upon the lower stop 31 to mesh the wheel 15 with the remainder of the wheel-train. At the end of the month, or other stated period when the reading of the meter is taken, the frame is elevated to permit the resetting of the trolley rack-bar without effecting the restoration of the counting portion of the wheel-train, as it is desired to integrate the totalized measurements during a number of periods. An upper stop 32 is provided for the purpose of limiting the upward movement of the frame, while a rod 33, projecting through the casing of the instrument, may be employed for moving the frame. The trolley rack-bar may be provided with a cord 34 at its left end, passing over a pulley 35, by which the rack-bar may be restored to its initial position after each reading, a projection 36 upon the rack-bar by engagement with the lug 37 upon the swinging frame serving to limit the movement of the rack-bar. This rack-bar may also have connected with its right-hand end a cord 38, passing over the pulleys 39, connected with a spring 40 for the purpose of assisting the counting-train in the operation of the rack-bar, the spring serving to overcome friction between the pinion 16 and the rack-bar and also serving, preferably, to compensate for friction in the rest of the wheel-train.

I have thus provided a simplified mechanism whereby one instrumentality need alone be adjusted to effect the desired operation of the meter.

By providing two trolley-rollers and an elongated trolley-bar 22 all grounding of conductors upon the instrument may be avoided.

I have thus shown circuits and controlling apparatus associated therewith for accomplishing the object of my invention; but I do not wish to be limited thereto.

It is obvious that changes may be made from the specific embodiment of the invention herein shown and particularly described, and I do not, therefore, wish to be limited to the precise embodiment thereof herein set forth; but,

Having thus described my invention, I claim as new, and desire to secure by Letters Patent—

1. The combination with a meter, of a resistance divided into sections for inclusion in circuit with a meter-winding, a movable support carrying terminals of the said sections, trolley-contacts, a trolley actuated by the meter for including a meter-winding in circuit, and adapted for successive engagement with the said contacts as the meter measures predetermined quantities of energy, means for connecting said trolley-contacts directly with the said meter-winding, whereby the meter may operate to measure loads without discount, and means whereby the terminals of the resistance-sections are brought into connection with remaining trolley-contacts, whereby the meter may operate at successively-reduced rates of operation per unit of load or energy, substantially as described.

2. The combination with a meter, of a resistance divided into sections for inclusion in circuit with a meter-winding, a movable support carrying terminals of the said sections, trolley-contacts, a trolley actuated by the meter for including a meter-winding in circuit and adapted for successive engagement with the said contacts as the meter measures predetermined quantities of energy, contact-buttons 30 with which the resistance-terminals are adapted for connection, the said contact-buttons being electrically connected with the trolley-contacts, and a switch-blade 25 adapted to connect buttons 30 together, the said resistance and blade 25 being connected with said meter-winding, whereby the meter may operate at slidingly-discounted rates, substantially as described.

3. The combination with a meter, of a resistance divided into sections for inclusion in circuit with a meter-winding, a movable support carrying terminals of the said sections, trolley-contacts, a trolley actuated by the meter for including a meter-winding in circuit and adapted for successive engagement with the said contacts as the meter measures predetermined quantities of energy, contact-buttons 30 with which the resistance-terminals are adapted for connection, the said contact-buttons being electrically connected with the trolley-contacts, and a switch-blade 25 adapted to connect buttons 30 together, the said resistance and blade 25 being connected with said meter-winding, whereby the meter may operate at slidingly-discounted rates, the support for the resistance-terminals and the switch-blade 25 being mounted upon a common rotatable support, substantially as described.

4. The combination with a meter, of a resistance, a movable support for a terminal of the resistance, trolley-contacts, a trolley actuated by the meter for including a meter-winding in circuit and adapted for successive engagement with the said contacts as the meter measures predetermined quantities of energy, contact-buttons 30 with which the resistance-terminal is adapted for connection, the said contact-buttons being electrically connected with the trolley-contacts, and a switch-blade 25 adapted to connect buttons 30 together, the said resistance and blade 25 being connected with the said meter-winding, the support for the resistance-terminal and the blade 25 being mounted upon a common actuatable support, substantially as described.

5. The combination with a meter, of an adjusting resistance for inclusion in circuit with a winding thereof, two electrically-connected trolleys 20 and 21 actuated by the meter, a trolley-bar 22 adapted for connection with one transmission-main and engaging a trolley 21, trolley-contacts adapted for engagement with the trolley 20, and means for connecting the same with the adjusting resistance, said adjusting resistance being adapted for connection with the other side of the transmission-circuit through a meter-winding, substantially as described.

6. The combination with a meter, of a resistance divided into sections for inclusion in circuit with a meter-winding, contact-terminals for said sections, a trolley adapted for engagement with said terminals and connected with said meter-winding, and means whereby said trolley may be brought into contact with said terminals, substantially as described.

7. The combination with a meter, of a resistance divided into sections for inclusion in circuit with a meter-winding, contact-terminals for said sections, a trolley adapted for engagement with said terminals and connected with said meter-winding, and means whereby said trolley may be brought into contact with successive terminals, whereby the meter may operate at successively-reduced rates of operation per unit of load or energy, substantially as described.

8. The combination with a meter, of a resistance divided into sections for inclusion in circuit with a meter-winding, contact-terminals for said sections, a trolley actuated by the meter for including a meter-winding in circuit and adapted for successive engagement with the said contacts as the meter measures predetermined quantities of energy, means for connecting said trolley-contacts directly with the said meter-winding, whereby the meter may operate to measure loads without discount, and means whereby the terminals of the resistance-sections are brought into connection with the remaining trolley-contacts, whereby the meter may operate at successive reduced rates of operation per unit of load or energy, substantially as described.

9. The combination with a meter, of a resistance divided into sections for inclusion in circuit with a meter-winding, contact-terminals for said sections, a trolley adapted for successive engagement with said terminals as the meter measures predetermined quantities of energy, said trolley being connected with said meter-winding, and means whereby said trolley may be brought into contact with successive terminals, whereby the meter may operate at successively-reduced rates of operation per unit of load or energy, substantially as described.

10. The combination with a meter, of a resistance divided into sections for inclusion in circuit with a meter-winding, means governed by the meter serving to connect the said sections of resistance in circuit with said meter-winding, whereby the meter may be operated at successively different rates of reduced speed, substantially as described.

11. The combination with a meter, of a sectional resistance for inclusion in circuit with a meter-winding, and switching mechanism controlled by said meter whereby said sectional resistance may be cut into circuit with the said meter-winding, whereby the meter may be operated at successively different rates of reduced speed, substantially as described.

12. The combination with a meter, of a sectional resistance for inclusion in circuit with the armature-winding, switching mechanism controlled by said meter, whereby said sectional resistance may be cut into circuit with said armature-winding, whereby the meter may be operated at successively different rates of reduced speed, substantially as described.

13. The combination with a meter, of a resistance divided as specified, and means governed by the meter and operating to control the circuit relation of said resistance, whereby the meter may operate at successively different rates of speed, substantially as described.

In witness whereof I hereunto subscribe my name this 3d day of June, A. D. 1901.

THOMAS DUNCAN.

Witnesses:
GEORGE L. CRAGG,
HARVEY L. HANSON.